United States Patent Office 3,479,059
Patented Nov. 18, 1969

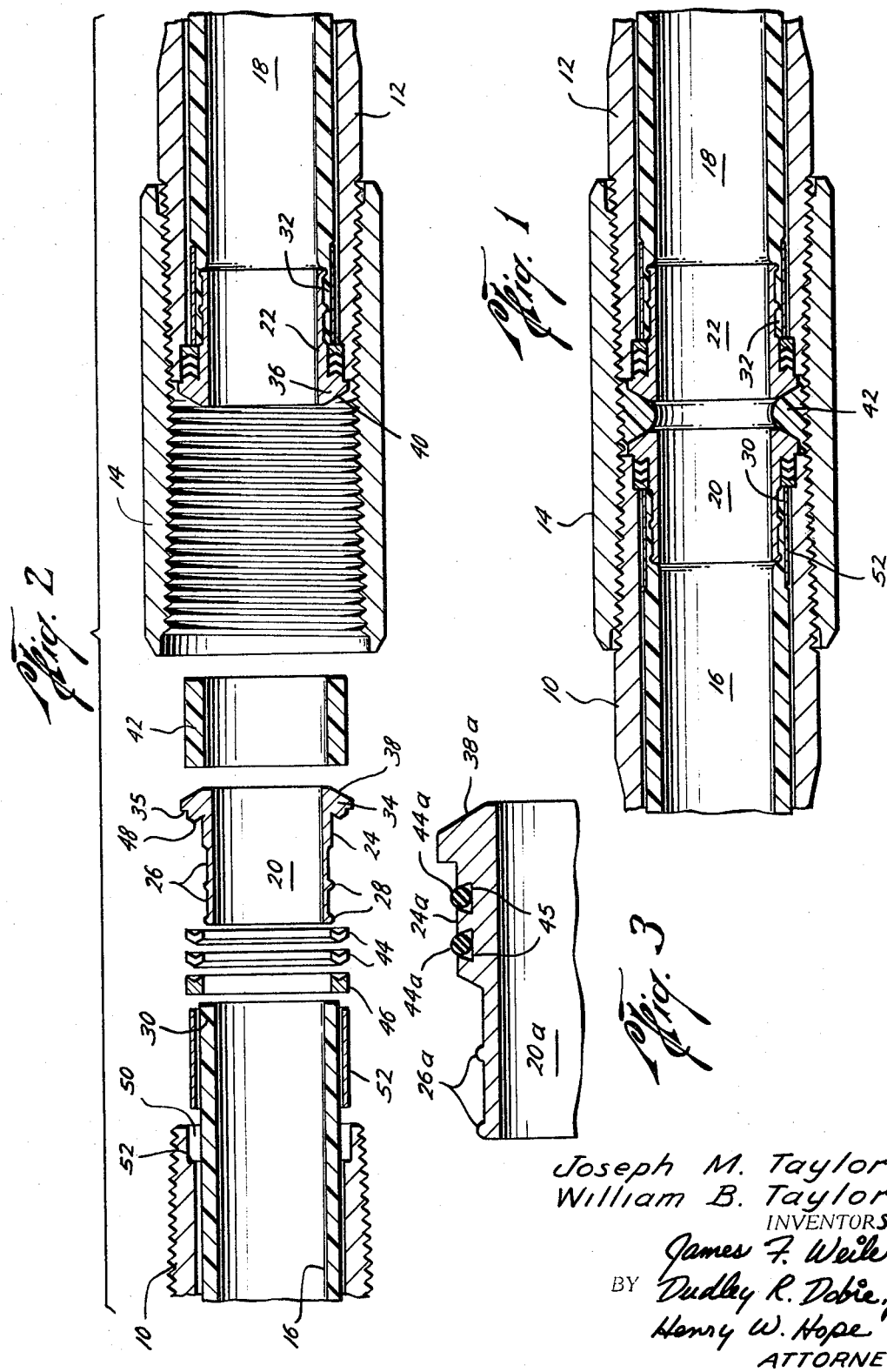

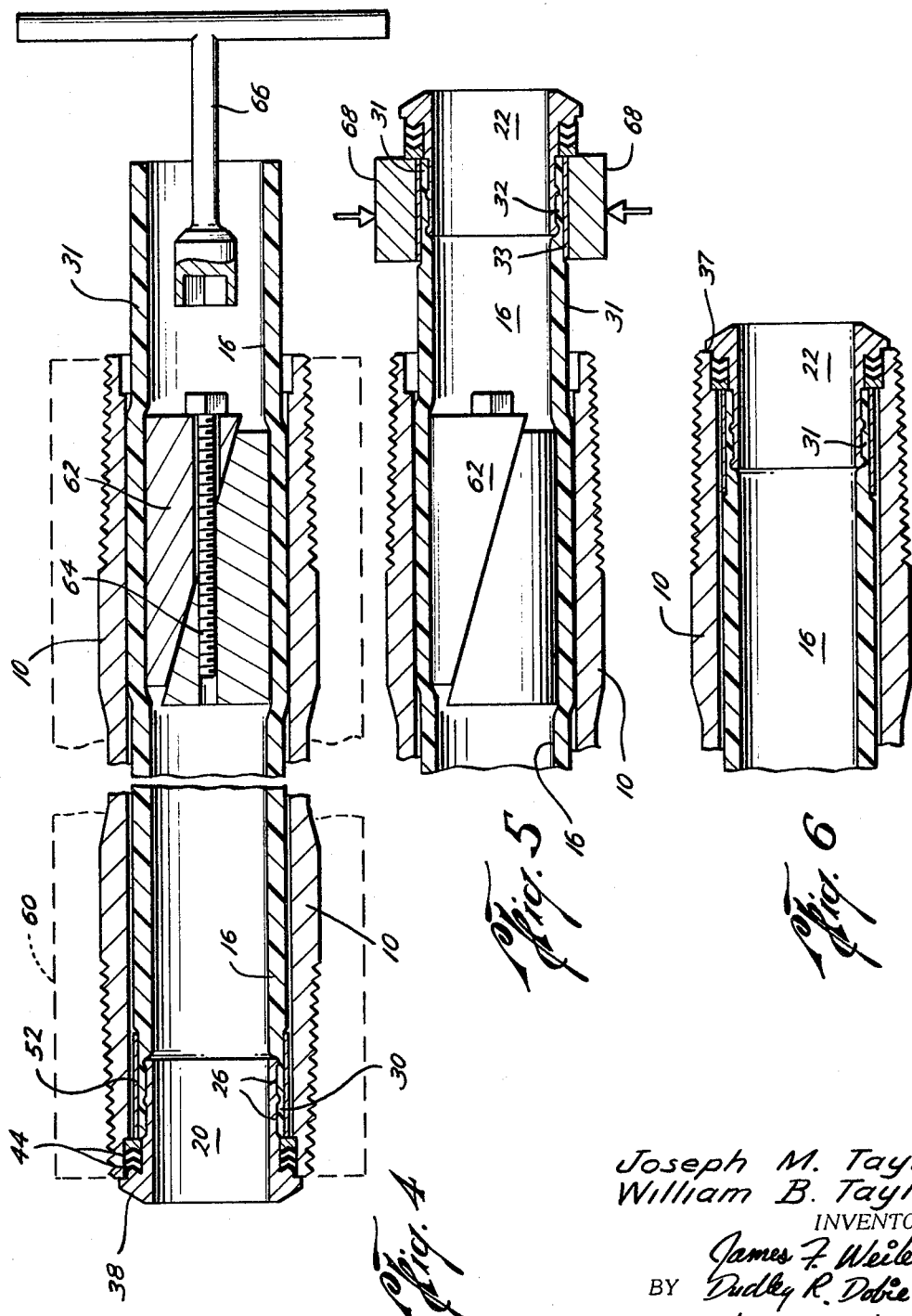

3,479,059
LINED PIPE SECTIONS AND JOINTS
William B. Taylor, Rte. 11, Box 154, East Houston Road 77016, and Joseph M. Taylor, 10239 Tarrington 77034 both of Houston, Tex.
Filed July 19, 1968, Ser. No. 746,019
Int. Cl. F16l 55/00, 59/16, 9/14
U.S. Cl. 285—55                                    11 Claims

ABSTRACT OF THE DISCLOSURE

Lined pipe sections each having a generally tubular, corrosion resistant liner, preferably formed of a thermoplastic material, disposed in and extending throughout the length of the pipe sections short of but adjacent to each of its ends. The liner has an outer diameter smaller than the internal diameter of the pipe section for easy insertion into the pipe section. A corrosion resistant ferrule having a generally tubularly shaped body and an inner diameter substantially the same as that of the liner and an outer diameter greater than the inner diameter of the liner and smaller than the inner diameter of the pipe section is inserted into each end of the liner at each end of the pipe section and a clamp ring is clamped about the liner clamping it to the ferrule which holds the liner in the pipe section. A nose portion is provided on each ferrule at its outer end which extends beyond the outer diameter of the liner adjacent each end of the pipe section. Packing is wedged and deformed between the outer body of the ferrule and the inner surface of the pipe beyond the end of the liner but within the pipe sealing the space between the liner and the pipe section. The outer surface of the nose portion of the ferrule may be provided with a frusto-conical sealing surface and a generally tubular deformable gasket having an internal diameter at least as large as that of the liner is deformed by and between opposite frusto-conical sealing surfaces and into the threads of a coupling securing the ends of the pipe section together thereby providing sections of pipe and joints connecting them together with a corrosion resistant liner which is pressure tight and will not leak under normal conditions of use and which will not impede flow through the pipe sections and joints.

BACKGROUND OF THE INVENTION

The present invention relates to lined pipe sections which are coupled together and which have a corrosion resistant lining, and, particularly to pipe sections lined with a thermoplastic material which is sealed, pressure tight, and does not leak under normal conditions of use.

The present invention is particularly suitable for sections of pipe joined together through which corrosive fluids flow. For example, in various chemical installations, and in the production of oil and gas wells through tubing, fluids flow which are corrosive to the pipe not provided with a corrosion resistant liner. In the past much work has been done in attempting to provide a satisfactory, leak proof corrosion resistant liner for pipe sections joined together. For example, the lining has been welded together at each joint. This is not entirely satisfactory since the lining must be cut each time the pipe section is disconnected and the liner has to be rewelded when the pipe sections are reconnected. This is, of course, time consuming and expensive. In order to solve this problem efforts have been made to provide lined sections of pipe which can be connected and disconnected without disturbing the liners, with a gasket between ends of the lined pipe sections. These have been unsatisfactory in that an effective pressure seal was not provided.

These problems were attempted to be solved by the lined pipe and pipe joints in U.S. Patent No. 3,298,716 granted Jan. 17, 1967. The lined pipe and pipe joints disclosed and suggested in this patent have not been satisfactory, however, because while they were thought to be leak proof, in actual practice under normal conditions of use, they do leak between the corrosion resistant liner and the pipe sections thereby destroying the effectiveness of the corrosion resistant liner. Also they require special forming of the liners at each end.

The present invention is directed to lined pipe sections which may be coupled together and have a leak proof connection between the ends of a tubular liner and each pipe section by a relatively simple and inexpensive arrangement and without any special forming of the liners.

SUMMARY

The present invention relates to pipe sections lined with corrosion resistant liners provided with an effective pressure seal at each end of the pipe section so that sections of pipe can be coupled together with a corrosion resistant lined coupling thereby providing an effective leak-proof corrosion resistant liner throughout the length of the pipe under normal usage conditions.

More particularly, the present invention relates to lined pipe sections in which tubular corrosion resistant liners are secured in pipe sections and which liners are effectively gripped at each end of the pipe section and which are provided with an effective sealing arrangement beyond the ends of the liner by relatively simple and inexpensive means.

It is, therefore, an object of the present invention to provide lined pipe sections having means by which a corrosion resistant, tubular liner is securely held in the pipe section and an effective pressure seal is provided at the ends of the pipe section between the inner wall of the pipe section and the outer wall of the liner.

A further object of the present invention is the provision of such lined pipe sections and means for connecting them together by which an effective corrosion-resistant lining throughout the length of pipe is provided, yet which requires no special forming of the liners and in which the pipe sections may be connected, disconnected and reconnected without damage to the liners and their seals.

A still further object of the present invention is the provision of sections of pipe provided with a corrosion resistant lining of thermoplastic material secured within the pipe and effectively sealed adjacent its end portions preventing corrosive fluids flowing within the lining from contacting the pipe sections.

A further object of the present invention is the provision of a pipe section lined with tubular thermoplastic stock material without any special forming which extends throughout the length of the pipe section to adjacent but just short of each end of the pipe section and which is held in place by a ferrule inserted into the liner at each end of the pipe section, which ferrule deforms a deformable packing into sealing engagement between it and the pipe and exteriorly of but adjacent to the end of the liner by simply inserting the ferrule into the ends of the liner and of the pipe section.

A further object of the present invention is the provision of such a lined pipe section in which no special forming tools are necessary in assemblying the lined pipe section or coupling the lined pipe sections together with a lined coupling.

These and other and further objects and advantages of the present invention will be apparent from the following description of presently-preferred embodiments of the invention given for the purpose of disclosure and taken in conjunction with the accompanying drawings.

BRIEF DESCRIPTION OF THE DRAWINGS

FIGURE 1 is a cross-sectional view of pipe sections according to the invention coupled together, FIGURE 2 is a partially-exploded, sectional view of a lined pipe section and joint and some of its components prior to assembly of one of the lined pipe sections and coupling them together as shown in FIGURE 1, FIGURE 3 is a fragmentary cross-sectional view illustrating an alternate form of sealing the lined pipe sections, FIGURE 4 is a longitudinal sectional view illustrating suitable means for stretching and holding the stretched liner in position in order to connect a ferrule to the last end of the liner in each pipe section, FIGURE 5 is a fragmentary view similar to FIGURE 4 illustrating clamping of the ferrule to the liner end, and FIGURE 6 is a fragmentary longitudinal sectional view of the ferrule clamped to the liner end inserted into the pipe section.

DESCRIPTION OF THE PREFERRED EMBODIMENTS

Referring now to the drawings, and particularly to FIGURE 1, a pair of pipe sections 10 and 12 are illustrated which are secured together by the threaded coupling 14. The pipe sections 10 and 12 and coupling 14 are all conventional, and as here shown, illustrate oil well tubing coupled together.

Disposed within each pipe section 10 and 12 is a corrosion resistant liner 16 and 18, respectively, which is generally tubular in construction and provides a substantially constant internal diameter. The liners 16 and 18 may be formed of any suitable corrosion resistant material, such as thermoplastic material. One such material which has been found to be suitable as a lining for pipe used for the production of high pressure natural gas and containing corrosive compounds such as hydrogen sulfide and salt water, is polypropylene although any suitable corrosion-resistant plastic material may be used which will withstand the conditions of use. Advantageously, thermoplastic tubular stock may be used which has an outer diameter of a size which will fit within the pipe sections 16 and 18.

Generally tubular ferrules 20 and 22 are inserted into the end portions of the liners 16 and 18, respectively, and preferably, as illustrated, the internal diameters of the ferrules 20 and 22 are substantially the same as that of the liners 16 and 18 to provide a smooth flow.

As best illustrated in the exploded portion of FIGURE 2, each ferrule 20 (and 22, only ferrule 20 being shown in this exploded portion), has a generally first diameter outer tubular body 24 whose outer diameter is greater than the inner diameter of the liner 16, and has a second reduced outer diameter portion 26 provided with friction means, here shown as a series of outwardly-extending, circumferential gripping projections 28. The gripping projections 28 are sufficient to firmly engage the inner surfaces of the end portions 30 and 32 of the liners 16 and 18 when assembled as illustrated in FIGURE 1 and as later described. Any suitable projections, serrations, threads and the like may be utilized which will securely grip the inner end portions 30 and 32 of the liner sections 16 and 18, respectively.

Referring again to FIGURE 2, the outer ends of each of the ferrules 20 and 22 are provided with radially, outwardly-extending nose portions 34 and 36 which are provided with the frusto-conical surfaces 38 and 40 which engage each end of the gasket or liner section 42 disposed between these opposed surfaces and which extrude and compress the liner 42 into sealing engagement with the threaded surface of the coupling 14 between these portions, as best illustrated in FIGURE 1.

Still with reference to FIGURE 2, the embodiment of the invention there illustrated utilizes a chevron packing arrangement including the chevron packing rings 44, a chevron packing ring 46 having a generally flat inner end, and an annular generally chevron-shaped inwardly extending projection 48 formed on the inner portion of the nose 34 which engages the chevron packing rings 44 and 46 and deforms them into sealing engagement as hereinafter described.

The only modification necessary for converting conventional pipe sections and couplings for providing a fully-lined pipe according to the invention is the machining out or otherwise providing an annular packing space 50 at each end of the pipe sections 10 and 12 for reception of the chevron packing members 44 and 46 and the inwardly-facing chevron projection 48 on the inner portion of the nose portions 34 and 36 of the ferrules 20 and 22, respectively.

A generally tubular crimp or clamp ring 52 is provided which has an internal diameter slightly in excess of the external diameter of the end portions 30 of the liner sections 16 and has an external diameter slightly less than the internal diameter of the end portions of the pipe sections 10 and 12 so that it snugly fits between the outer end portions 30 of the liners 16 and 18 and the inner end portions of the pipe sections 10 and 12 upon assembly.

In assemblying the lined pipe sections, and with reference to FIGURE 2, the tubular liner 16 is inserted into the pipe section 10 and the liner 16 is of such a length that it extends throughout the pipe section 10. The clamp ring 52 is then inserted about the end 30 of the liner 16. The ferrule 20 with the chevron packing rings 44 and 46 disposed about the first-reduced diameter surface 24 is then inserted into the end 30 of the liner 16. The clamp ring 52 is then clamped into position clamping the end 30 to the ferrule 20. The end 30 of the liner 16 is then inserted into the end of the pipe section 10. As best illustrated in the assembled portion of FIGURE 2 and in FIGURE 1, the liner section 16 is securely anchored in place and the chevron projecting surface 48 on the underside of the nose portion 34 engages the chevron packing rings 44 and expands them into sealing engagement with the walls of the packing recess 50 and the first outer diameter portion 24 of the ferrule 20 thereby effecting an effective pressure seal against gas and fluid pressures. Hand pressure is sufficient to insert the ferrule 20 as described and upon such insertion provides a gripping action for the end of the liner and a pressure seal, all as described.

In order to attach the ferrule 22 to the other end 31 of the liner 16 it is necessary to stretch the liner beyond the other end of the pipe section 10. Referring now to FIGURE 4, the pipe section 10 with the ferrule 20 and liner in position as shown are heated such as in an oven 60 illustrated in dotted lines. The liner 16 is then stretched by any suitable means until about two inches of the end 31 of the liner 16 is stretched out of the pipe section 10. The end 31 then clamped to the inside of the pipe section 2 by the expander by tightening the screw 64 by the detachable wrench 66. If desired the holder 62 may be used to pull or stretch the liner 16 and then further expanded to clamp it to the pipe section 10. The wrench 66 is then removed. The liner 16, if not previously cut to size, may then be cut to the desired length. For thirty foot sections of pipe using a polyethylene liner heated to 150° F. about two inches of the liner should extend beyond the end of the pipe section.

As best seen in FIGURE 5, the ferrule 22 is clamped in the end 31 of the liner 16 by the clamp ring 33 being clamped by the clamping jaws 68. While not shown for convenience of illustration, a tubular back up member may be placed within the ferrule 22 to support it while the clamp ring 33 is being clamped or crimped.

The holding assembly 62 is then contracted by turning the screw 64 with the wrench 66 until released. Cooling of the liner 16 and pipe section 10 pulls the end 31 and the ferrule 22 into the end of the pipe section 10 to the differences in their coefficients of thermal expansion; althrough, the ferrule 22 may be pushed into the end of the pipe 10 by any suitable means, now shown.

In all cases, the liner 16 should be stretched sufficiently so that up release the ferrules are snugly positioned in each end of the pipe section with the undersides 35 and 37 of their nose portions against the ends of the pipe section 10. When utilizing chevron-type packing the liner should hold the ferrules 20 and 22 tight enough to compress the chevron packing rings into sealing position as previously described.

A generally tubularly shaped gasket 42, preferably formed of the same material as the liner sections 16 and 18, or of any deformable corrosion resistant material for the purposes of use, is provided which has an outer diameter less than the inner diameter of the coupling 14 so that it may be inserted into the coupling 14 between the opposed frusto-conical sealing surfaces 38 and 40 of the ferrules 20 and 22. Preferably, the coupling 14 and gasket 42 are then heated until the gasket is soft, then a pair of dies having tubular shearing edges, not shown, are moved into the gasket 42 to press it into the threads of the coupling 14 and to shear off any excess of the gasket 42 extending into its passage. The dies are then withdrawn. The coupling 14 with the gasket 42 is then connected to the pipe sections 10 and 12 which causes further extrusion of the gasket 42 but only a very small amount into the central passageway as best illustrated in FIGURE 1.

The ferrules 20 and 22 are preferably made of a completely corrosion-resistant material which has sufficient strength to resist cracking or other breakage when two pipe sections 10 and 12 are coupled together by the coupling 14. A metal material such as heat treated K Monel metal has been found to be satisfactory in practice. Such heat treated K Monel is an age-hardened alloy having the following approximate composition: nickel 65.3%, copper 29.5%, iron 1%, titanium 0.5%, manganese 0.6%, carbon 0.15%, silicon 0.15%, and sulphur 0.005%.

Another embodiment of the present invention is illustrated in FIGURE 3, to which reference is now made, in which the reference letter *a* has been added to numbers designating like parts in FIGURES 1 and 2 for convenience of reference. In this embodiment an O-ring type packing arrangement has been substituted for the chevron type packing arrangement illustrated in FIGURES 1 and 2. Accordingly, a pair of O-rings 44*a* are provided in the recesses 45 in the first outer tubular diameter portion 24*a* of the ferrule 20*a*. These resiliently and sealingly engage the inner annular surface of the packing recess 50 in the ends of the pipe section 10, such as illustrated in FIGURE 2, when the ferrule 20*a* is inserted into the end of the pipe section and the end 30 of the liner 16. The other parts are the same as previously described and no further detailed description is deemed necessary. The O-ring packing arrangement illustrated in FIGURE 3 provides an effective pressure seal against gas and fluid pressures.

The expander surfaces 38 and 40 on the noses 34 and 36 of the ferrules 20 and 22 are, as previously mentioned, frusto-conical in shape so that as they contact the gasket 42 it will be deformed and extruded outwardly and into engagement with the interior threads of the coupling 14 and prevent it from flowing inwardly to provide an obstruction to flow through the joint. Preferably, the surfaces 38 and 40 lie in a cone having its apex on the center line and beyond the ends of the pipe sections 10 and 12. Preferably, the angle of the surfaces 38 and 40 with relation to the center line of the pipes 16 and 18 may be varied from approximately 30° to 75° and, preferably, approximately 42° to 44°, so that the gasket is compressed and extruded outwardly into engagement with the interior of the coupling 14 as previously described.

While the ferrules 20 and 22, may be inserted into place by hand pressure, a tool of some character may be utilized to force them into such frictional engagement, for example a jack may be secured to the pipe having a member to engage the outer surfaces 38 and 40 of the ferrules 20 and 22 and force them into the ends of the pipe sections and liner. Since any desired means may be used for inserting the ferrules 20 and 22 as described, which means forms no part of the present invention, no detailed description thereof is deemed necessary or given.

From the foregoing, it is seen that the pipe sections and made up joints are completely lined and sealed against corrosive fluids flowing through the pipe and which requires no special forming of liners or pipe sections. It is only necessary that a packing recess 50 be machined or otherwise provided in each end of the pipe sections. Standard tubular stock may be utilized for the liners. Thus, a fully-lined, corrosion resistant and effectively-sealed pipe sections and joints are provided which may be connected, disconnected and reconnected without damage to the lined pipe sections.

While the invention is particularly useful for strings and joints of tubing used in oil wells, it is useful for all types of pipe, casing, joints, various lines and the like.

The present invention, therefore, has the advantages and features and attains the objects and ends mentioned as well as others inherent therein.

While presently-preferred embodiments of the invention have been given for the purpose of disclosure, changes may be made therein which are within the spirit of the invention.

We claim:
1. A lined pipe section comprising
   a pipe section,
   a corrosion resistant liner disposed in and extending throughout the length of the pipe section to adjacent each of its ends,
   said liner being generally tubular throughout its length and having an outer diameter smaller than the internal diameter of the pipe section for easy insertion of the liner into the pipe section,
   a pair of corrosion resistant ferrules each having a generally tubularly-shaped body, the inner diameter of which is substantially the same as the inner diameter of the liner and having an outer diameter portion greater than the inner diameter of the liner and smaller than the inner diameter of the pipe section,
   one of the ferrules being clamped into each end of the liner at each end of the pipe section,
   a nose portion on each of the ferrules at its outer end, said nose portion having an outer diameter greater than the outer diameter of the liner adjacent each end of the pipe section, said ferrules engaging said pipe section and holding the liner in the pipe section,
   and a pair of packing means, one each disposed between and in sealing engagement with the outer surface of the body of each of the ferrules beyond each end of the liner and the inner surface of the pipe section adjacent its end.
2. The lined pipe section of claim 1 where,
   the pipe section is provided with an enlarged internal annular recess at each of its ends,
   each of the ferrules has a first diameter portion of its tubular body, and a reduced diameter second portion on its body,
   the packing means being disposed between the inner surface of the pipe section and the first diameter portion,
   the reduced diameter portion including projections frictionally engaging the liner, and
   a clamp ring about the end of the liner clamping the liner to reduced diameter portion of the liner.
3. The lined pipe section of claim 2 where,
   each recess at the end of the pipe section includes an annular outwardly-facing shoulder, and
   where the packing means comprises chevron packing rings disposed in the recess and deformed by the nose portion and the shoulder into sealing engage- ment in the recess and against the first diameter portion of the ferrule.

4. The lined pipe section of claim 2 where the packing means comprises O-rings deformed into sealing engagement between the inner wall of the recess and the first diameter portion of the ferrule.

5. The lined pipe section of claim 2 where the corrosion resistant liner is formed of a thermoplastic material.

6. A lined pipe section comprising,
a section of pipe provided with threads at each end and an internal annular recess at each end,
a thermoplastic liner disposed in and extending throughout the length of the pipe section to adjacent the recess at each end,
said liner being generally tubular throughout its length and having an outer diameter smaller than the internal diameter of the pipe section for easy insertion of the liner into the pipe section,
a pair of corrosion resistant ferrules each having a generally tubularly-shaped body, the inner diameter of which is substantially the same as the inner diameter of the liner and having a first outer diameter portion and a second reduced outer diameter portion greater than the inner diameter of the liner and smaller than the inner diameter of the pipe,
a nose portion on each ferrule at its outer end extending radially beyond the outer diameter of the liner,
friction means on the second reduced outer diameter portion of each ferrule for frictionally engaging the inner surface of the liner,
one each of the ferrules being disposed in each end of the pipe section and the second reduced diameter portion disposed in the end of the liner, the friction means engaging the inner surface of the liner and nose portion extending radially beyond the outer diameter of the liner,
a clamp ring clamped about each end of the liner and about the friction means on the second reduced outer diameter clamping the ferrules to the ends of the liner, and
deformable packing means deformed into wedging and sealing engagement between the first outer diameter portion of each of the ferrules and the inner wall of the recess at each end of the pipe section and exteriorly of each end of the liner.

7. The lined pipe section of claim 6 where the recess at each end of the pipe section is provided with an outwardly-facing annular shoulder, and where the parking means comprises,
chevron packing rings deformed between the annular shoulder and the inner portion of the nose portion of the ferrule into wedging and sealing engagement between each ferrule and each recess.

8. The lined pipe section of claim 6 where the packing means comprises O-rings deformed into wedging and sealing engagement with the inner wall of the recess and the first diameter portion of the ferrule.

9. Lined pipe sections and joint comprising
a pair of lined pipe sections of claim 6,
a threaded coupling threadedly securing the pair of lined pipe sections together into end to end alignment.
each of the nose portions of the ferrules provided with a frusto-conical sealing surface, and
a generally tubular deformable gasket having an internal diameter at least as large as that of the liners, deformed and extruded between the sealing surface of each of the ferrules into the coupling.

10. The lined pipe sections and joint of claim 9 where each of said recesses has an outwardly facing shoulder, and
where the packing means comprises,
chevron packing rings wedged into sealing engagement with the inner wall of the recess and the first outer diameter portion of the ferrule by the inner portion of the nose portion and the annular shoulder.

11. The lined pipe sections and joint of claim 9 where the packing means comprises,
O-rings wedged between the inner wall of each recess and the first outer diameter portion of the ferrule.

References Cited
UNITED STATES PATENTS

| | | | |
|---|---|---|---|
| 2,260,454 | 10/1941 | Hedeman | 285—242 |
| 2,340,852 | 2/1944 | Wormeley | 285—259 X |
| 3,235,291 | 2/1966 | Jacoby | 285—55 |
| 3,298,716 | 1/1967 | Taylor et al. | 285—55 |

FOREIGN PATENTS

| | | |
|---|---|---|
| 427,434 | 6/1911 | France. |
| 851,150 | 10/1952 | Germany. |
| 267,697 | 3/1927 | Great Britain. |
| 839,730 | 6/1960 | Great Britain. |

DAVID J. WILLIAMOWSKY, Primary Examiner

DAVE W. AROLA, Assistant Examiner

U.S. Cl. X.R.

285—256, 347, 351, 369